United States Patent
Novak et al.

(10) Patent No.: US 6,750,002 B2
(45) Date of Patent: Jun. 15, 2004

(54) PROCESS FOR THE PREPARATION OF CONCENTRATED DYE-WATER COMPOSITIONS

(75) Inventors: James E. Novak, Walworth, NY (US); Jeffrey S. Baugher, Rochester, NY (US); Dirk J. Hasberg, Rochester, NY (US); Lloyd A. Lobo, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 137 days.

(21) Appl. No.: 10/058,395

(22) Filed: Jan. 28, 2002

(65) Prior Publication Data

US 2003/0175629 A1 Sep. 18, 2003

(51) Int. Cl.$^7$ .................. G03C 1/005; G03C 1/494
(52) U.S. Cl. .................. 430/570; 430/546; 430/631; 430/449; 430/572; 430/574; 430/581; 430/582; 430/583; 430/584; 430/585; 430/586; 430/587; 430/588
(58) Field of Search .................. 430/570, 546, 430/631, 449, 572, 574, 578, 581–588

(56) References Cited

U.S. PATENT DOCUMENTS

| | | | |
|---|---|---|---|
| 4,006,025 A | * | 2/1977 | Swank et al. ............. 430/631 |
| 4,284,709 A | | 8/1981 | Tomka |
| 4,474,872 A | * | 10/1984 | Onishi et al. ............. 430/546 |
| 4,555,481 A | | 11/1985 | Ukai et al. |
| 4,683,193 A | * | 7/1987 | Ihama et al. ............. 430/570 |
| 5,330,887 A | | 7/1994 | Hasebe et al. |
| 5,374,512 A | | 12/1994 | Heki et al. |
| 5,436,122 A | | 7/1995 | Shigetomi |
| 5,541,047 A | * | 7/1996 | Kashiwagi et al. ......... 430/572 |
| 5,554,495 A | * | 9/1996 | Tsuji ....................... 430/530 |
| 5,587,282 A | | 12/1996 | Nakatsugawa et al. |
| 5,591,570 A | | 1/1997 | Takiguchi et al. |
| 5,657,931 A | | 8/1997 | Nair et al. |
| 5,726,000 A | | 3/1998 | Nakanishi et al. |
| 5,965,345 A | | 10/1999 | Link et al. |
| 6,143,486 A | * | 11/2000 | Parton et al. ............. 430/574 |
| 6,165,703 A | * | 12/2000 | Parton et al. ............. 430/631 |
| 6,331,385 B1 | * | 12/2001 | Deaton et al. ............. 430/572 |
| 6,361,932 B1 | * | 3/2002 | Parton et al. ............. 430/572 |

FOREIGN PATENT DOCUMENTS

| | | |
|---|---|---|
| EP | 0 640 225 | 10/1992 |
| EP | 0 694 590 | 1/1996 |
| EP | 0 985 970 | 3/2000 |
| GB | 1 570 362 | 7/1980 |
| JP | 5-297496 | 11/1993 |

OTHER PUBLICATIONS

A. H. Herz; "Dye–Dye Interactions Of Cyanines In Solution And At AgBr Surfaces"; Photographic Science And Engineering, Society Of Photographic Scientists And Engineers; Washington; US; vol. 18; No. 3; May 1974; pp. 323–335.

Alexander K. Chibisov et al; "Effects Of Surfactants On The Aggregation Behaviour Of Thiacarbocyanibe Dyes"; Chemical Physics, Nov. 15, 1999; Elsevier, Netherlands; vol. 250; No. 1; pp. 47–60.

* cited by examiner

*Primary Examiner*—Geraldine Letscher
(74) *Attorney, Agent, or Firm*—Andrew J. Anderson

(57) ABSTRACT

A process for preparing a concentrated photographic spectral sensitizing dye-water composition which comprises adding an anionic sensitizing dye to an aqueous medium in the substantial absence of organic solvent, and agitating the combined dye and aqueous medium, wherein the anionic dye forms a liquid-crystalline dye phase in the aqueous medium and the agitation is performed in the presence of a nonionic surfactant having an HLB of less than 12 and an aqueous solubility at 25° C. of greater than 10 ppm, which nonionic surfactant is in the aqueous medium at a level of from 10 to 1000 ppm. In a specific embodiment of the invention, where the viscosity (at 0.1 s$^{-1}$ shear rate) of the dye-water composition in the absence of the nonionic surfactant would be greater than 100 cp and especially where such viscosity would be greater than 500 cp, the surfactant is preferably present at a level sufficient to substantially reduce air entrainment during agitation of the dye-water composition.

31 Claims, No Drawings

PROCESS FOR THE PREPARATION OF CONCENTRATED DYE-WATER COMPOSITIONS

FIELD OF THE INVENTION

This invention relates to a process for preparing concentrated dye-water compositions for use in the spectral sensitization of photographic emulsions, wherein the compositions are formed at concentrations of anionic dyes sufficient to form a liquid crystalline dye phase in the absence of organic solvent and presence of an antifoamant nonionic surfactant.

BACKGROUND OF THE INVENTION

Many dyes useful for spectrally sensitizing silver halide emulsions are known to be substantially insoluble in water for all practical purposes. Accordingly, such dyes, as well as other photographic additives which are capable of being adsorbed on the grain surfaces of silver salts, have been added to photographic silver halide emulsions in the form of solutions in suitable water miscible solvents such as methyl alcohol, dimethylformamide or the like. However, spectrally sensitizing dyes are difficult to dissolve in the usual solvents. Consequently, large quantities of solvent are often needed for satisfactory dissolution of such additives. This presents a significant problem since the presence of residual solvent generally causes diffusion and migration of spectrally sensitizing dyes in the emulsion. Further, even minute residues of solvent promote recrystallization processes in the photographic layer which, in turn, adversely affect not only the dyes and other additives introduced using solvent but other additives in the emulsion as well. Moreover, if residues of polar organic solvents miscible with water remain in a silver halide emulsion, particularly a silver-rich emulsion having a high silver packing density, the residual solvent considerably reduces the stability of the casting emulsion which in turn causes a reduced stability during processing including phase separation between hydrophilic and hydrophobic phases, agglomeration, and coalescence as well as flocculation before casting.

Additives which need not be held on the surface of silver halide crystals by adsorption after their introduction into a photographic emulsion have long been incorporated into silver halide emulsions in the form of dispersions. For that purpose, the additive is usually dissolved in a suitable solvent, which is generally immiscible with water, in the presence of an oil former and wetting agent, and then emulsified into an aqueous gelatin solution. The low boiling solvent generally used for this purpose is subsequently removed and the resulting dispersion is added to the photographic silver halide emulsion. Unfortunately, the complete removal of the solvent from the resulting dispersion is difficult to achieve, even when low boiling solvents are employed, and particularly when polar solvents are employed. Polar solvents, in particular polar protic solvents, can be removed from gelatin dispersions only by heating, a process which adversely effects the stability of the sensitizing dye molecule. Alternatively, the use of a vacuum to remove the solvent often causes considerable foaming.

One method for obviating the harmful effects of using water miscible or immiscible organic solvents to incorporate substantially insoluble additives into silver halide emulsions and dispersions as described in British Patent 1,570,362 is to sand mill such additives in water to a particle size of less than 1 micron in the presence of a surfactant which gives rise to a surface tension of not less than 38 dynes/cm in water when used in a quantity of 1 g/l. A similar process is disclosed in U.S. Pat. No. 4,006,025 which teaches milling or homogenizing at an elevated temperature in the presence of a relatively high level of surfactant in which the sensitizing dye is at least partially soluble. The process is complicated and the use of surfactant increases finish time.

U.S. Pat. No. 4,474,872 also describes a sensitizing dye dispersion process for substantially water insoluble dyes which requires mechanically milling to a fine grain size (1 micron or less), but teaches that the use of a surfactant can be eliminated if the dye is ground at elevated temperatures (60°–80° C.), and processing conditions such as pH are strictly controlled. U.S. Pat. No. 4,683,193 similarly discloses forming dispersions of sensitizing dyes having water solubility of 0.01% by weight or less by mechanically dispersing the dyes generally at temperatures of from 40 to 80° C., and in the absence of a dispersing agent at temperatures of from 60 to 80° C. While the ability to form sensitizing dye dispersions in the absence of organic solvents and surfactants is desirable, the need for relatively high temperatures is potentially problematic as the dyes are subject to decomposition damage.

EP 0 640 225 describes a process of preparing concentrated dye-water compositions of spectral sensitizing dyes in the absence of organic solvent or surfactant at moderate temperatures of from 20–50° C., wherein the spectral sensitizing dye is selected to be slightly water soluble (at least 0.005 wt %), and a dye-water composition containing dye at a concentration higher than the solubility limit of the dye is agitated for an extended time period of at least 30 minutes. JP Kokai 05-297496 similarly discloses a method of dispersing spectral sensitizing dyes which have limited levels of solubility in water (0.0002 to 0.04 mol/L) in the absence of organic solvents and surfactants, wherein the dyes are mechanically dispersed in the form of solid particles.

For most materials, it is generally accepted that only three states of matter exist; namely, solids, liquids and gases. However, some materials exhibit a fourth state of matter commonly referred to as a liquid crystal phase (or mesophase). Liquid crystal phases are neither crystalline solids nor isotropic liquids, but exhibit some of the characteristics of both. A liquid crystal phase can be described simply as being a liquid with a certain degree of molecular order. This molecular order gives rise to measurable anisotropy in the bulk properties of a material that is otherwise much like a liquid. Consequently, the physical properties of liquid crystalline materials are unique and distinct from those of solids and liquids. It has been found that many dyes may be advantageously dispersed directly in an aqueous medium at concentrations above their water solubility levels in the form of well-ordered liquid-crystalline phases (a lyotropic mesophase), such as dyes which form smectic liquid-crystalline phases (W. J. Harrison, D. L. Ma-teer & G. J. T. Tiddy, J. Phys. Chem. 1996, 100, pp 2310–2321). More specifically, many anionic sensitizing dyes will form liquid-crystalline J-aggregates in aqueous-based media (see The Theory of the Photographic Process, 4th edition, T. H. James, editor, Macmillan Publishing Co., New York, 1977, for a discussion of aggregation). Mesophase-forming dyes may be readily identified by someone skilled in the art using polarized-light optical microscopy as described by N. H. Hartshorne in The Microscopy of Liquid Crystals, Microscope Publications Ltd., London, 1974.

Because of the small size of the liquid crystalline domains in liquid crystalline dispersions or suspensions and the interactions between them, the viscosities of liquid crystalline anionic sensitizing dye dispersions are typically very high, particularly at low shear. However, because these structures are interacting, the dispersions also exhibit strong shear thinning behavior (i.e., their viscosity drops precipitously with increase in the shear rate). The manufacture of such dispersions thus requires high shear mixing of the aqueous phase to overcome the high viscosity of the final dispersions and to ensure that mixing occurs through the entire aqueous phase.

While the preparation of concentrated dye-water compositions comprising liquid crystalline dispersions in the absence of organic solvent and surfactants would be desirable, the preparation of such compositions has been found to be complicated by the problem of air entrainment. Air bubbles may be easily generated, e.g., by cavitation at the tip of impellers used to perform high shear agitation. Another source of air bubbles in the entrainment of air due to formation of a vortex. Since anionic dyes typically have a mild surface activity, they can stabilize entrained air bubbles, resulting in a stable foam. The presence of foaming can substantially reduce the capacity of manufacturing equipment, and also the effectiveness of the dispersion forming process. Additionally, the complete absence of surfactant and resulting high surface tension can lead to a problem of being unable to completely deliver the sensitizing dye composition from equipment used to prepare the dye composition.

SUMMARY OF THE INVENTION

In accordance with the invention, a process for preparing a concentrated photographic spectral sensitizing dye-water composition is described which comprises adding an anionic sensitizing dye to an aqueous medium in the substantial absence of organic solvent, and agitating the combined dye and aqueous medium, wherein the anionic dye forms a liquid-crystalline dye phase in the aqueous medium and the agitation is performed in the presence of a nonionic surfactant having an HLB of less than 12 and an aqueous solubility at 25° C. of greater than 10 ppm, which nonionic surfactant is in the aqueous medium at a level of from 10 to 1000 ppm. In a specific embodiment of the invention, where the viscosity (at 0.1 $s^{-1}$ shear rate) of the dye-water composition in the absence of the nonionic surfactant would be greater than 100 cp and especially where such viscosity would be greater than 500 cp, the surfactant is preferably present at a level sufficient to substantially reduce air entrainment during agitation of the dye-water composition.

The process of the invention is simple, versatile and forgiving. It does not require the use of organic solvents, milling of the dye to very fine starting grain sizes, use of highly elevated temperatures, or pH control. The process of the invention employs anionic dyes at concentrations which are sufficient to form a liquid-crystalline dye phase, which concentrations will generally exceed that amount of dye which is soluble in the dispersion medium at the preparation, usage, or storage temperatures of the composition. Preferably, from 0.4 to 5 weight percent of dye based on the total weight of the mixture is employed. The addition of a nonionic surfactant as specified greatly reduces or eliminates foam formation caused by air entrainment during the agitation step. The surface tension reduction of the dye-water compositions also aids transfer of the composition from containers and helps flush the dye composition from holding vessels. The low levels of nonionic surfactant employed do not affect the quality of the photographic emulsion sensitization. The use of nonionic surfactant and resulting reduced or eliminated foam also allows for the preparation of higher concentration compositions (e.g., compositions comprising from 1.0 to 5, or even 2.0 to 5 wt % dye), with resulting benefits of increased productivity, reduced cost, and reduced water content in the resulting sensitized emulsions.

DETAILED DESCRIPTION OF THE INVENTION

The process of the invention provides concentrated sensitizing dye-water compositions comprising liquid-crystalline dispersions or suspensions of anionic sensitizing dyes that are homogeneous, resistant to settling, solvent-free and contain only a low level of nonionic surfactant. If some settling does occur, slight agitation or mixing renders the composition homogeneous once again.

Generally, a solid powder of an anionic sensitizing dye is mixed into an "aqueous medium", which term includes a polymer-containing aqueous medium (water-polymer medium, such as an aqueous gelatin solution), at a concentration of dye sufficient for the formation of a liquid-crystalline dye phase in the aqueous medium. Anionic dyes are in general slightly soluble in water, and the amount employed sufficient to form a liquid-crystalline phase thus must be greater than that which will simply dissolve in the medium at the temperature, pressure, or other conditions of processing, storage, or use of the composition. The dye-water composition is then agitated in the presence of a relatively small amount of nonionic surfactant which functions as an antifoamant. Dye amounts ranging from about 0.4 to about 5 weight percent based on the total weight of the components of the composition are preferred. Because the process is carried out in the absence of solvent and high levels of dispersant surfactants, it is simpler, faster, more forgiving, and more flexible than prior processes.

The process of the invention can be employed using any spectral sensitizing anionic dyes, particularly spectral sensitizing anionic cyanine dyes, which form a liquid-crystalline dye phase when dispersed in an aqueous medium. Preferred anionic sensitizing dyes for use in accordance with the invention include those of the formula

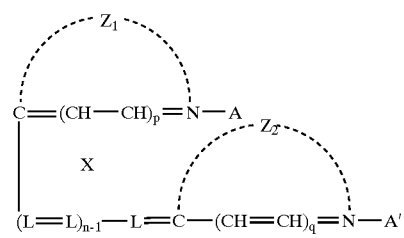

wherein $Z_1$ and $Z_2$ each independently represents the atoms necessary to complete a substituted or unsubstituted heterocyclic nucleus, each L independently represents a substituted or unsubstituted methine group, n is a positive integer of from 1 to 4, p and q each independently represents 0 or 1, A and A' each independently represents an alkyl group substituted with an anionic acid solubilizing group, and X represents hydrogen or a cationic counterion to balance the charge of the molecule. The acid solubilizing group substituted alkyl substituents represented by A and A' may be further substituted or unsubstituted. Examples of acid solubilizing group containing substituents represented by A and A' include: carboxymethyl, carboxyethyl, carboxypropyl, phosphonopropyl, phosphonobutyl, sulfatoethyl, thiosulfatopropyl, and preferably sulfoalkyl groups such as sulfoethyl, sulfopropyl, 3-sulfobutyl, 4-sulfobutyl, 2-hydroxy-3-sulfopropyl, and sulfoethylcarbamoylmethyl. It is recognized that anionic dyes are usually isolated as salts of the acid substituents. Common counterions which may be represented by X are sodium, potassium, triethylammonium (TEA+), tetramethylguanidinium (TMG+), diisopropylammonium (DIPA+), and tetrabutylammonium (TBA+).

Even more preferred are dyes having the formula

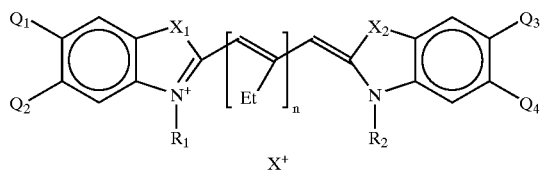

wherein n is 0 or 1; $X_1$ and $X_2$ each independently represents oxygen or sulfur; $Q_1$, $Q_2$, $Q_3$ and $Q_4$ each independently represents hydrogen, halogen, alkyl, aryl, alkoxy, aryloxy or may contain the atoms necessary to form a beta or linear naphtho-fused ring; $R_1$ and $R_2$ each independently represent an alkyl group substituted with an anionic acid solubilizing group as described for A and A' above, preferably sulfoalkyl or substituted sulfoalkyl groups; and $X^+$ is H or a cationic counterion as described for X above.

Representative dyes which may be used in the practice of this invention include structures D-1 through D-52. While such representative dyes are depicted with specific cationic counterions or with no indicated counterion (i.e., in acid form), it will be apparent to the artisan that various counterions may readily be employed with each such dye in the practice of the invention.

D-1

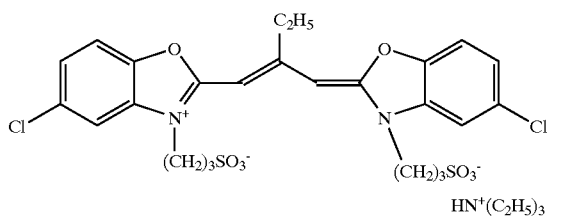

D-2

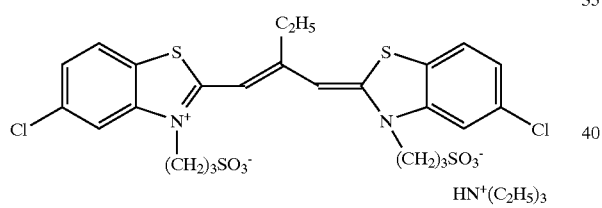

D-3

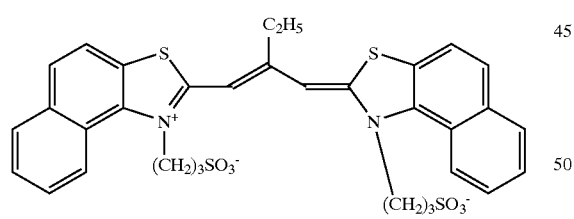

D-4

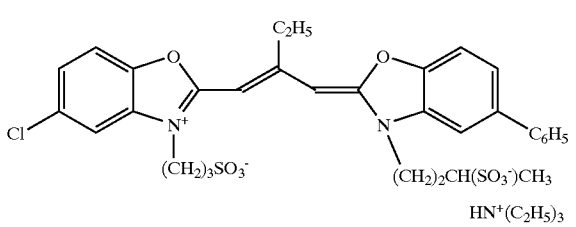

D-5

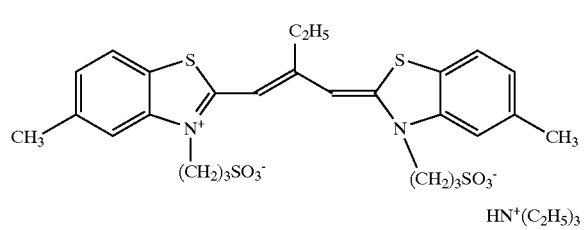

D-6

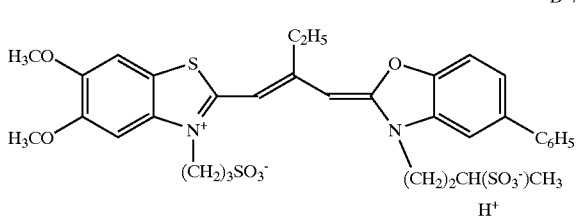

D-7

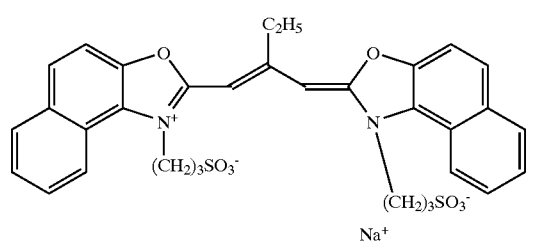

D-8

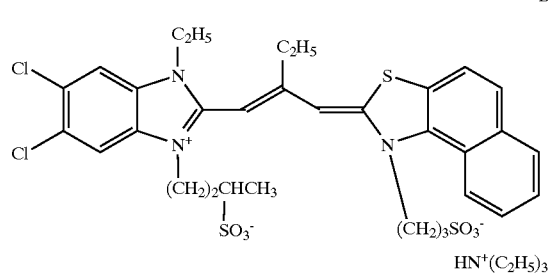

D-9

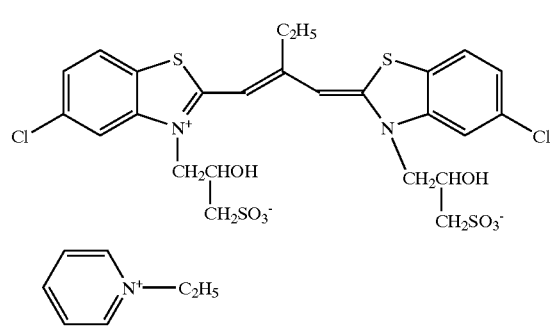

-continued
D-10
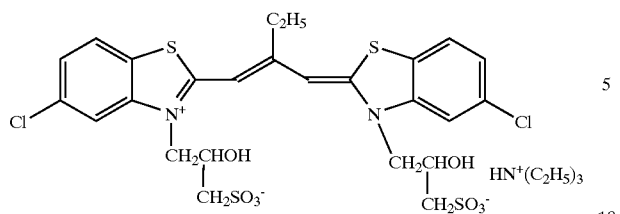
D-11
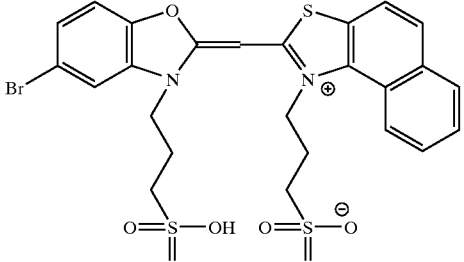
D-12
D-13
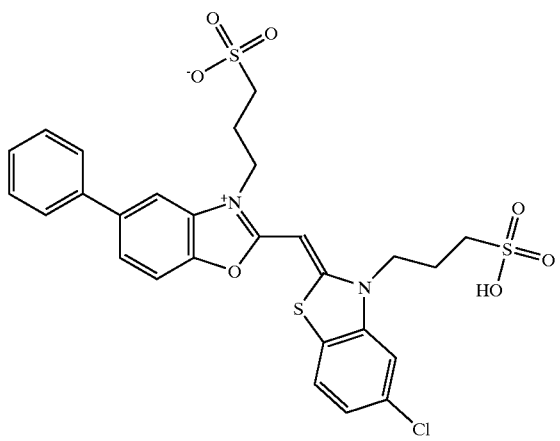
D-14
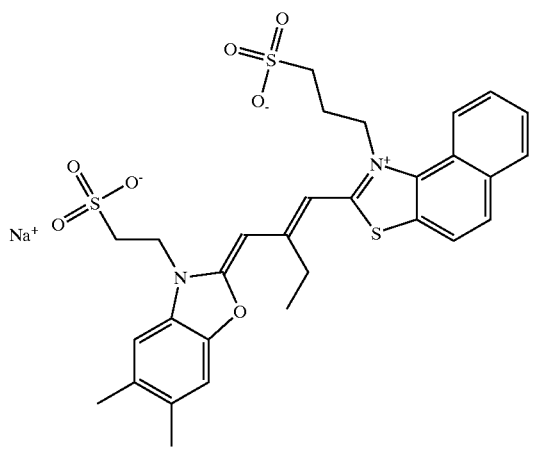
-continued
D-15
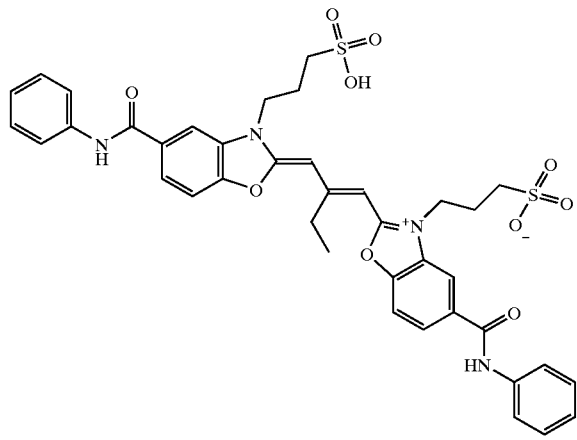
D-16
D-17
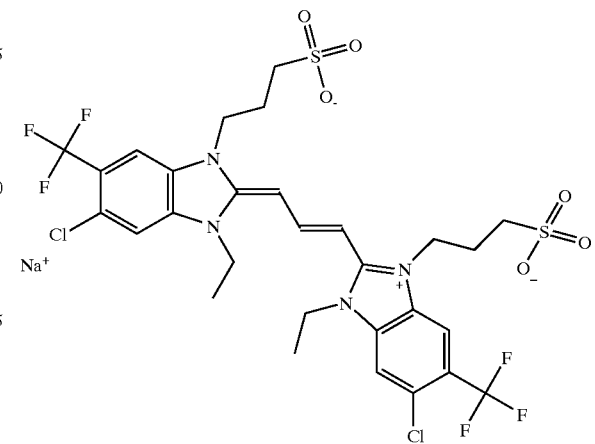
D-18
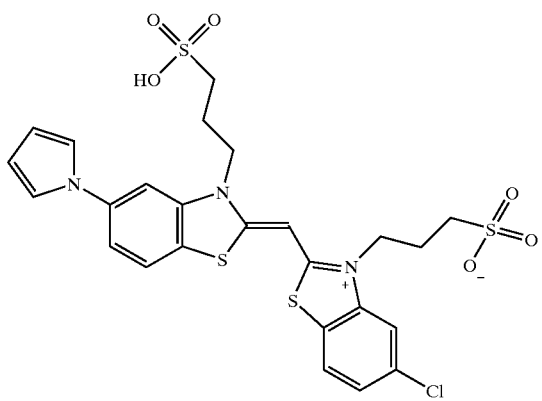

D-19
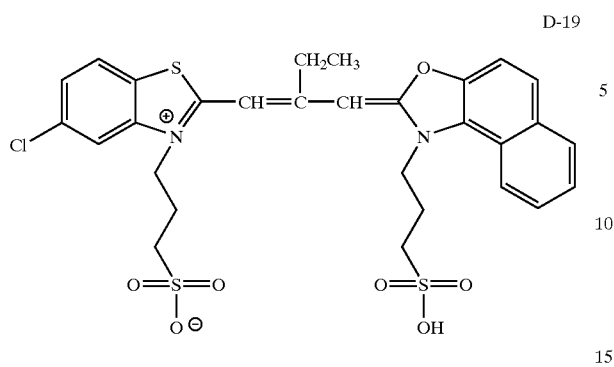
D-20
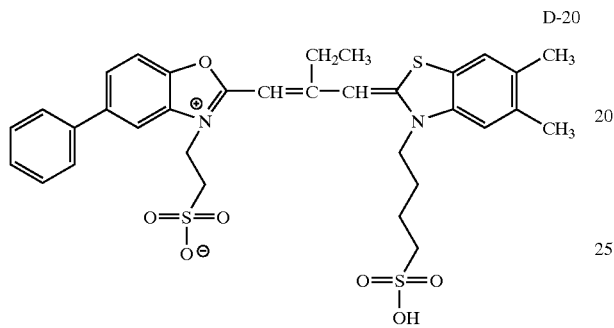
D-21
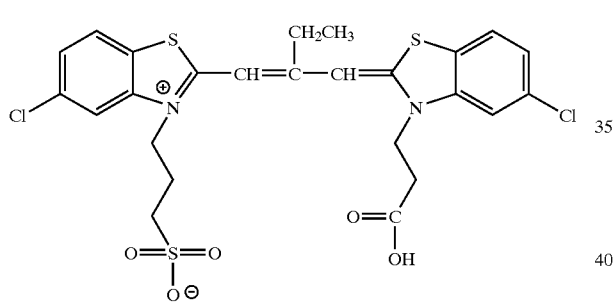
D-22
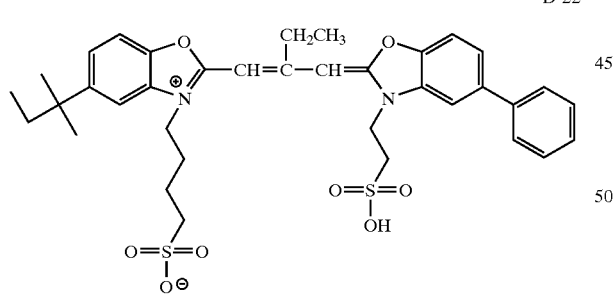
D-23
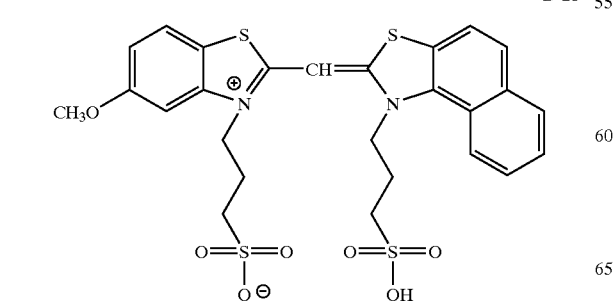
D-24
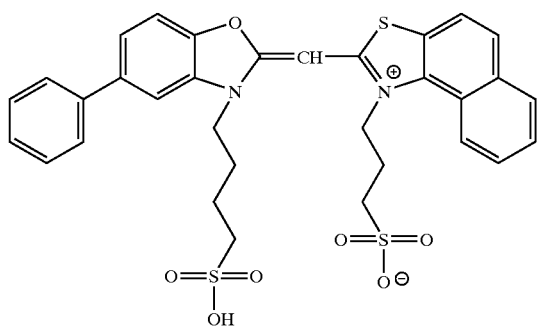
D-25
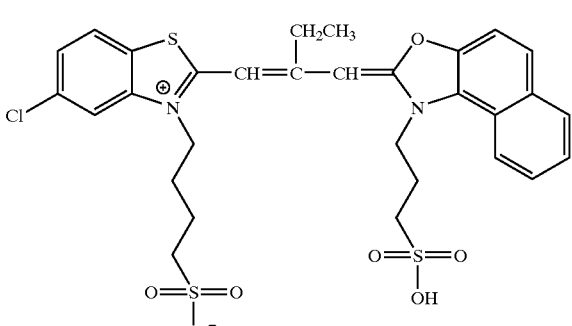
D-26
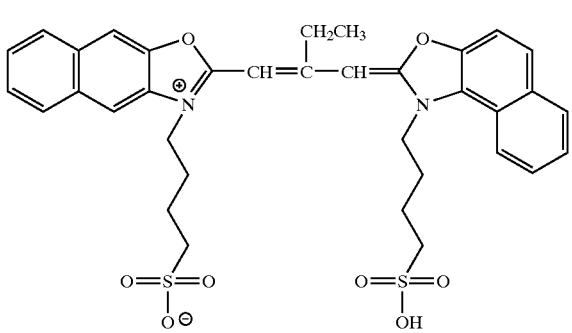
D-27
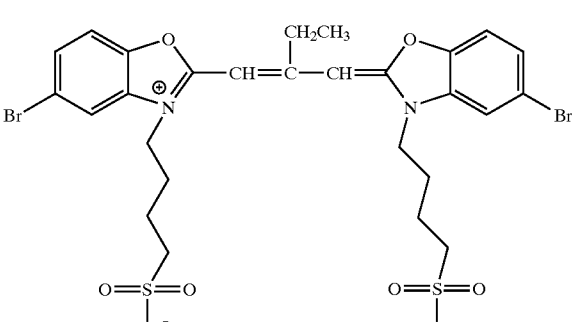
D-28
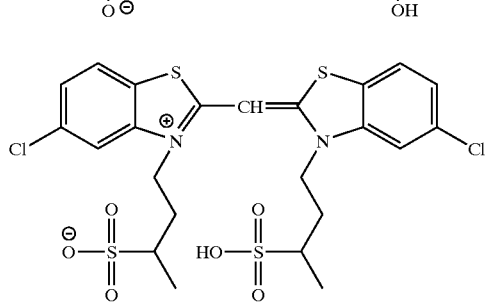

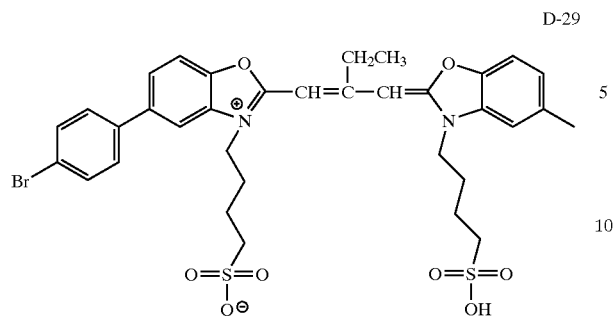
D-29
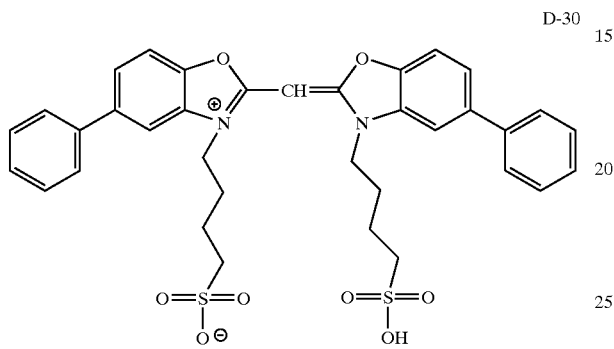
D-30
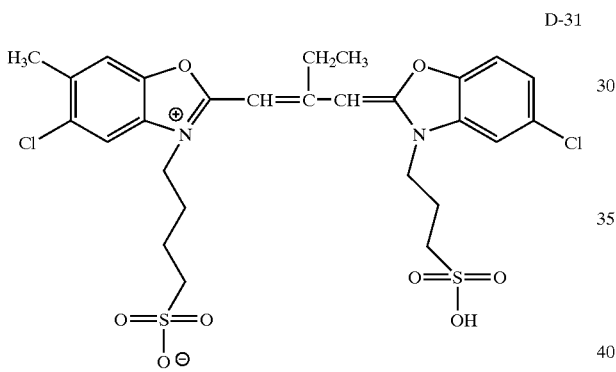
D-31
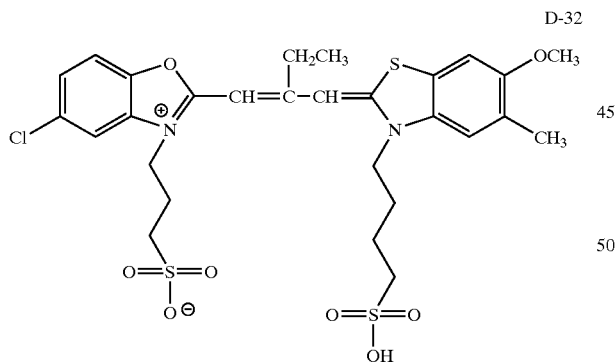
D-32
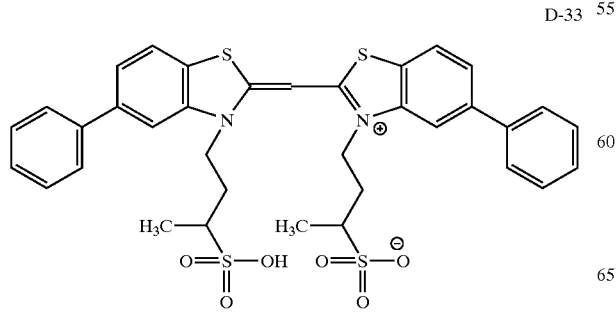
D-33
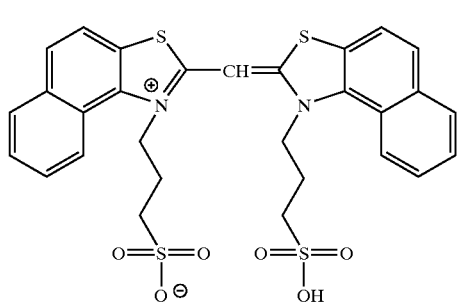
D-34
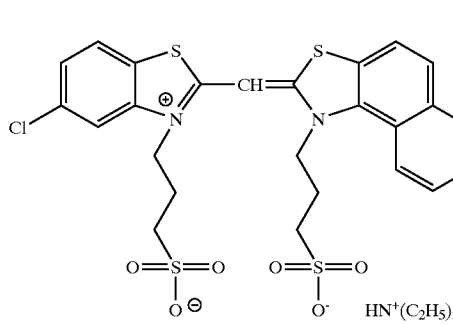
D-35
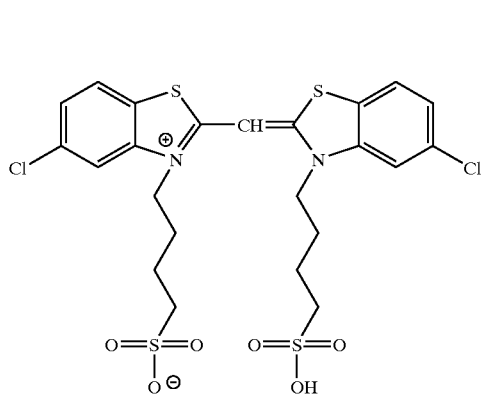
D-36
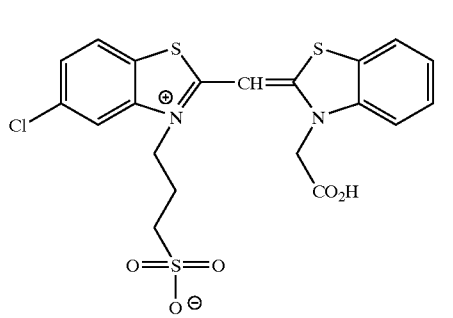
D-37
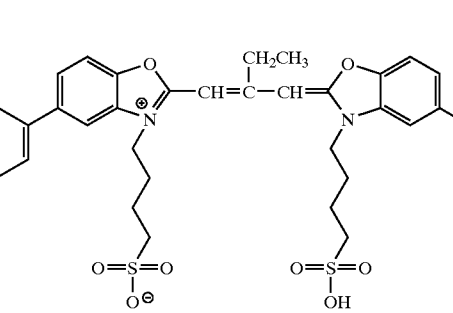
D-38

-continued
D-39
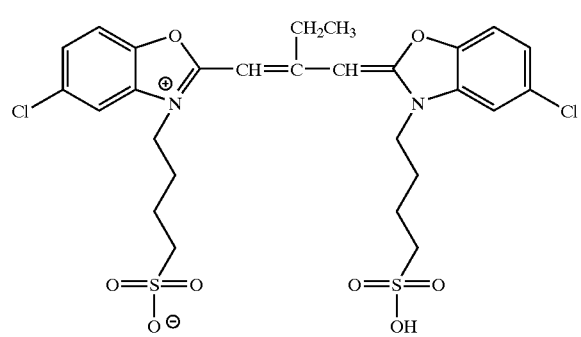
D-44
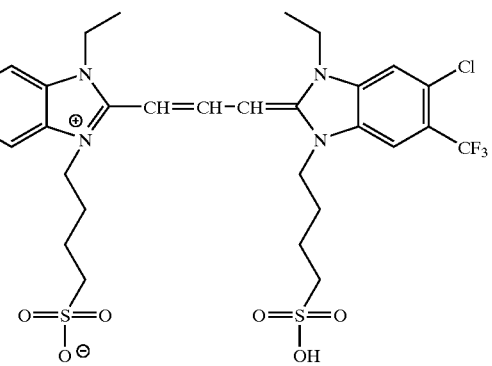
D-40
D-45
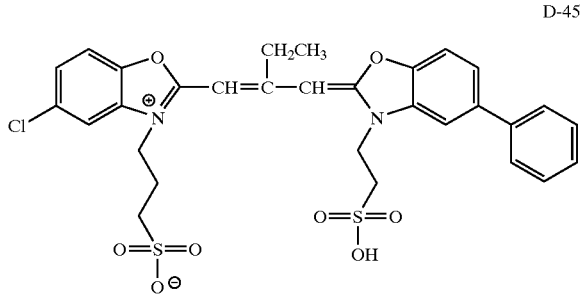
D-41
D-46
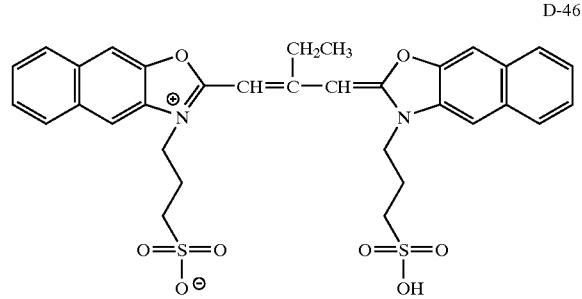
D-42
D-47
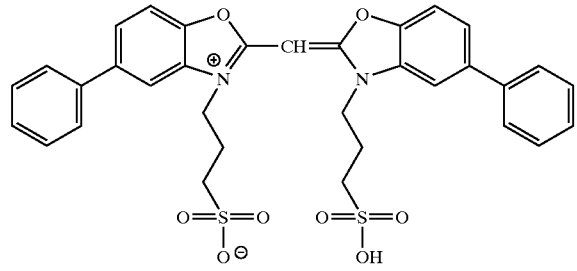
D-43
D-48
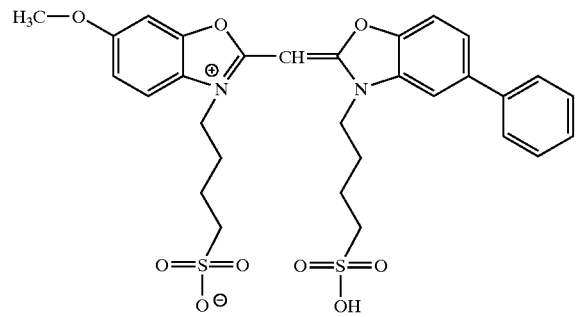

-continued

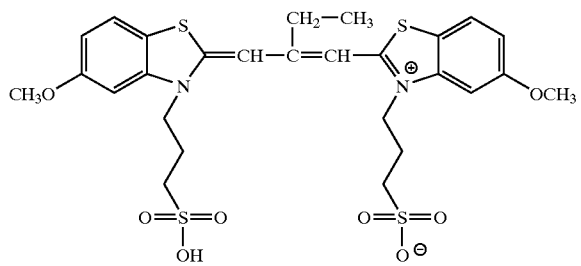
D-49

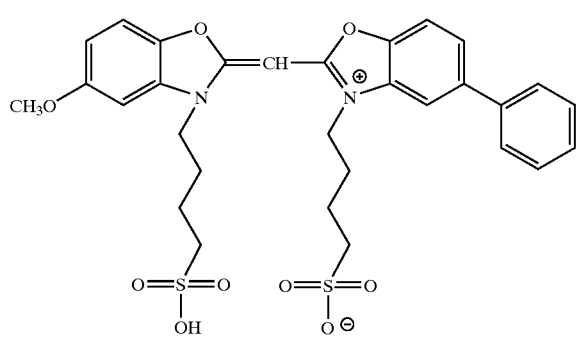
D-50

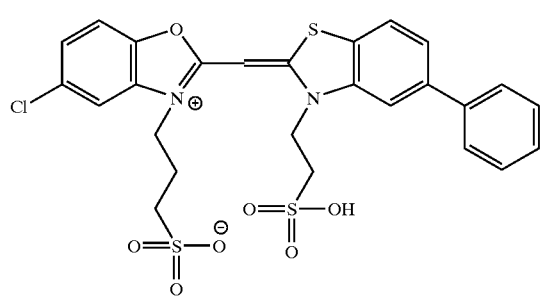
D-51

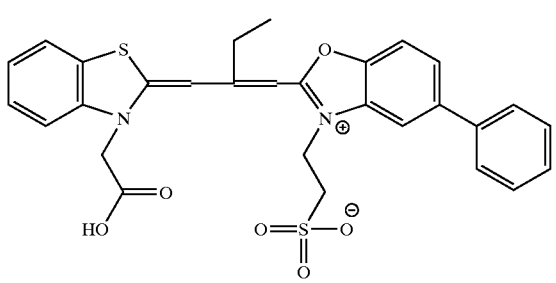
D-52

Liquid-crystalline mesophase-forming anionic sensitizing dyes may be readily identified by someone skilled in the art using polarized-light optical microscopy as described by N. H. Hartshorne in The Microscopy of Liquid Crystals, Microscope Publications Ltd., London, 1974. In one embodiment, preferred anionic dyes when dispersed in the aqueous medium of choice (including water or aqueous gelatin) at optimum concentration and viewed in polarized light as thin films sandwiched between a glass microscope slide and cover slip display the birefringent textures, patterns and flow rheology characteristic of distinct and readily identifiable structural types of mesophase (e.g. smectic, nematic, hexagonal).

In a preferred embodiment of the invention, the anionic dye is selected from among those which when dispersed in the aqueous medium as a liquid-crystalline phase generally exhibit J-aggregation resulting in a unique bathochromically shifted spectral absorption band yielding high fluorescence intensity. Many anionic sensitizing dyes are known which will form J-aggregates in aqueous-based media (see The Theory of the Photographic Process, 4th edition, T. H. James, editor, Macmillan Publishing Co., New York, 1977, for a discussion of aggregation). In particularly preferred embodiments of the invention, the dye or dyes form a liquid-crystalline phase in aqueous medium at a concentration of from 0.4 to 5 weight percent. According to the invention, certain surfactants can be used as antifoaming agents, which surfactants do not detrimentally interact with the sensitizing dyes and which do not themselves foam at the low concentrations that are used. In order to work, these materials are required to displace and replace the sensitizing dyes from the surfaces of any air bubbles which are formed at fairly low concentrations. At the same time, these materials are sufficiently soluble or easily dispersed into fine particles (<10 nm) so that they have a high shelf stability in the dye-water compositions.

The nonionic surfactants used as antifoaming agents in this invention have HLB numbers below 12. In essence, the HLB number of a surface active material is used to specify the nature of an oil/water dispersion that is formed in the presence of the surface active material. If the HLB is less than 7, the dispersed (the drop) phase will be water. If the HLB is above 12, the dispersed phase is oil. It can also be used to predict its ability to form a foam, where oil is replaced by air. In a congruent manner, if the surface active material has an HLB number of 12 or greater, the higher is its probability of stabilizing a foam. In the concentrated dye-water compositions of the invention, the antifoaming agent, which is a surface active material, is expected to completely displace and replace sensitizing dye at the surface of air bubbles. Additionally, the new adsorbed layer should not be a stabilizer for foams. Thus, the requirement that the antifoaming agent have a HLB number less than 12. On the other hand, if the HLB is too low, the solubility of the surface active material in the aqueous phase will be too low to provide an effective active concentration, in the aqueous phase, for the antifoaming agent to work. Also, if the solubility is low, the antifoaming agent will be dispersed as large drops, which can create problems in the shelf stability and functionality of the concentrate sensitizing dye-water compositions. Accordingly the nonionic surfactant employed in accordance with the invention is also selected to have an aqueous solubility at 25° C. of greater than 10 ppm. In preferred embodiments of the invention, the antifoaming agent is selected to have an HLB number of at least 2 (i.e., of from 2 to 12).

The HLB of surface active materials can be measured or calculated. There are several methods of measuring HLB. These methods are listed in "Nonionic Surfactants", Ed. M. Schick, "Surfactant Science Series", Vol. 1, Marcel Deker Inc., New York, 1967. A technique using gas chromatography is commonly used, where the surface active material is deposited on an acid washed chromatographic resin—Chromosorb® P resin from an acetone solution. A column, 3 ft long and ¼ inch in diameter is prepared. With the column maintained at 80° C., a 3.0 μl sample of a standard 1:1 ethanol/hexane solution is injected into the instrument. The retention times of each peak are measured and the ratio P of the retention time of ethanol to hexane is calculated. P is directly related to the HLB value of the surface active material as reported by Becher and Birkmeier, J. American Oil Chemists' Soc., Vol. 41, p 8, 1964. The HLB number is usually reported by surfactant manufacturers, or else, it can be approximately calculated by the preferred method described in the above reference.

There are several kinds of nonionic surfactants that meet the requirements for the antifoaming agent of the present invention. These include ethoxylated alcohols having the generic formula R—O(CH$_2$CH$_2$O)$_n$H where R can be alkyl, aryl or aralkyl with 2–30 carbon atoms and n can vary from 2 to 20. The HLB of the ethoxylated alcohols is related to ratio of the number of ethylene oxide groups to the number of carbon atoms in the R group. The HLB number of ethoxylated alcohols can be calculated by the formula E/5, where E is the wt % of ethylene oxide in the molecule (ref.: "Nonionic Surfactants", Surfactant Science Series, Vol. 23, Martin Schick, Ed., Marcel Dekker, NY, 1987). Commercially available examples of such materials include Brij93™ (ethoxylated (2) ether of oleyl alcohol) made by ICI Corp. A subset of this class of materials are fluorinated surfactants or ethoxylated fluorocarbons, where all or some of the hydrogen atoms in the R group are substituted by fluorine atoms. Commercially available examples of such materials include FC171™ made by 3M Corp.

Another class of nonionic surfactant materials are block copolymers of ethylene oxide and propylene oxide, where the ratio of the propylene oxide to the ethylene oxide amounts is directly related to the HLB of the surfactant. Examples of these are BASF Pluronics™ (poloxamers) which are triblock copolymers and Tetronics™ (poloxamines), which are tetrafunctional block copolymers derived from the sequential addition of propylene oxide and ethylene oxide to ethylenediamine.

Another class of nonionic surfactant materials are sugar surfactants based on hydrophobically modified derivatives of mono and disacchamides, including sorbitol esters such as SPANS™, alkyl glucosides such as Glucate DO™ (a dioelate ester of methyl glucoside) and hydrophobic sucrose esters such as sucrose distearate. The degree of modification, i.e., number and length of the hydrophobic segments, determines the HLB.

Another class of nonionic surfactant materials are polyalkylene-modified poly(dimethylsiloxanes), or alkoxylated PDMS materials, including those containing ethylene oxide as well as ethylene oxide and propylene oxide and having HLB values in the range defined by this invention. These surfactants have a polydimethylsiloxane backbone with a graft of mixed chains of polypropylene oxide and polyethylene oxide attached via a linking group. The HLB value of the surfactant is varied by adjusting the ratio of the number of ethylene oxide groups to the propylene oxide and dimethylsiloxane groups. Examples of these include Silwet™ surfactants, such as Silwet L-7602.

The antifoaming agents used in the present invention are typically used in relatively small amounts. Based on their medium HLB values, these surfactants have limited solubility in aqueous solutions. In addition, since most of them have an ethylene oxide block as the hydrophilic entity, these surfactants have a cloud point, which is the highest temperature at which the surfactant is soluble in water. Above this temperature, the ethylene oxide groups lose their water of hydration and therefore make the surfactant insoluble. Therefore, it is important that these surfactants be used at levels below their solubility limit at the operating temperature. In general, the amount required is that which can completely displace the sensitizing dye from the surface of any air bubbles. Due to their high surface activity compared to the lower surface activity of the sensitizing dyes, levels between 10 and 1000 parts per million, and preferably less than about 500 parts per million, are sufficient to accomplish defoaming. More preferably, the amount used is between 10 and 200 ppm.

The dye compositions of the invention can also contain a polymeric binder or protective colloid which can be used in the photographic emulsion layers or intermediate layers of a photographic light-sensitive material. Gelatin is advantageously used although other hydrophilic colloids can be used alone or together with gelatin. Either lime processed or acid processed, deionized gelatin can be used.

Preferably, the medium to which the dye and nonionic surfactant are added is heated to a preparation temperature ranging from about 20° to about 50° C. and maintained at that temperature throughout dye addition and mixing, as higher temperatures are generally not necessary. When gelatin is employed, it is preferred that a temperature greater than about 40° C. is used although lower temperatures can be used with other polymers. Where it is desired to include gelatin into the concentrated dye-water compositions, it is preferred to first mix gelatin with water and then heating to prepare an initial gelatin solution. The gelatin solution may then be heated and stirred or mixed or otherwise agitated while an anionic sensitizing dye in accordance with the invention is introduced, preferably in the form of a powder slowly and uniformly over the surface of the mixture being stirred. The process is also flexible in that one temperature can be used during addition while a different temperature is used during mixing.

Mixing or agitation is continued after the addition of the dye to the aqueous medium is complete and until little evidence of the particles of the original dye powder can be observed. This generally requires from about 5 minutes to typically less than 1 hour. The presence of surfactant in accordance with the invention generally results in shorter mixing times being required for complete conversion of the dye into a dispersed liquid crystalline phase, and in most instances advantageously enables mixing times of less than 30 minutes to generally be sufficient. The composition can be mixed or agitated by any suitable means using any suitable device including magnetically driven stirring bars of various shapes and motor driven shaft stirrers of the propeller or Cowles type. The following formula provided by J. Y. Oldshue in "Fluid Mixing Technology", McGraw-Hill, New York, 1983, p. 83, can be used to calculate the preferred amount of agitation to be used:

$$p/kg = (\text{Diameter})^5 \times (RPM)^3 / \text{Batch size}$$

in which Diameter=diameter of Cowles or other blade in inches and Batch size=kg. Best results in terms of complete conversion of the dye into a dispersed liquid crystalline phase can be obtained when $p/kg > 50 \times 10^9$.

The solvent-free dye-water compositions prepared by the process of the invention and containing from about 0.4 to about 5 weight percent of anionic dyes in the form of a dispersed liquid crystalline phase are resistant to settling. Similar compositions prepared by prior methods or containing other forms of dyes require either a solvent or significantly higher levels of dispersants to provide similar results or else comprise complicated and difficult preparatory methods.

Sensitizing dye-water compositions obtained in accordance with the invention may be used to spectrally sensitize any suitable silver halide for use in a photographic emulsion layer of a photographic light-sensitive silver halide material. The manufacturing process of silver halide elements usually comprises an emulsion making step, a chemical and optical sensitization step, and a coating step. The silver halide emulsion making step generally comprises a nucleation step, in which silver halide grain seeds are formed, followed by one or more growing steps, in which the grain seeds achieve their final dimension, and a washing step, in which all soluble salts are removed from the final emulsion. A ripening step is usually performed between the nucleation and growing step and/or between the growing and the washing steps.

Silver halide emulsions can be prepared using a single-jet method, a double-jet method, or a combination of these methods and can be ripened using, for instance, an ammonia method, a neutralization method, or an acid method. Features which may be adjusted to control grain growth include pH, pAg, temperature, shape and size of reaction vessel, and the reaction method (e.g., accelerated or constant flow rate precipitation, interrupted precipitation, ultrafiltration during precipitation, reverse mixing process and combinations thereof). A silver halide solvent, such as ammonia, thioethers, thioureas, etc., may be used, if desired, for controlling grain size, form of the grains, particle size distribution of the grains, and the grain-growth rate.

Commonly employed halogen compositions of silver halide grains can be used in the preparation of silver halide emulsions spectrally sensitized with liquid crystalline dye dispersions prepared in accordance with the invention. Suitable silver halides include silver bromide, silver iodobromide, silver chlorobromide, silver iodochlorobromide, silver chloroiodobromide, silver chloride, silver bromochloride, silver iodochloride, silver iodobromochloride, silver bromoiodochloride and the like. The grains of these silver halide emulsions may be coarse or fine, and the grain size distribution may be narrow or broad. In addition, the silver halide grains may be regular grains having a regular crystal structure such as cube, octahedron, and tetradecahedron, or the spherical or irregular crystal structure, or those having crystal defects such as twin planes, or those having a tabular form, or combination thereof. The halogen composition of individual grains may be homogeneous or heterogeneous. Furthermore, the grain structure of the silver halides may be uniform from the interior to exterior thereof, or be multilayer. According to a simple embodiment, the grains may comprise a core and a shell, which may have different halide compositions and/or may have undergone different modifications such as the addition of doping agents. Liquid crystalline dye dispersions prepared in accordance with the invention, e.g., may be used to sensitize silver halide grains having either a higher or a lower surface iodide concentration relative to the average overall grain iodide concentration. Besides having a differently composed core and shell, the silver halide grains may also comprise different phases in-between. Furthermore, the silver halides may be of such a type as allows a latent image to be formed mainly on the surface thereof or such a type as allows it to be formed inside the grains.

Tabular grain silver halide emulsions may preferably be sensitized with a liquid crystalline dye dispersions prepared in accordance with the invention. Tabular silver halide grains are typically regarded as grains having a diameter-:thickness ratio (often referred to in the art as aspect ratio) of at least 2, and tabular grain silver halide emulsions are often characterized by their average aspect ratio. The present invention is especially useful for sensitizing both high aspect ratio tabular grain silver halide emulsions (those having an aspect ratio of at least 8:1), as well as lower aspect ratio tabular grain emulsions (e.g., those having an aspect ratio of 2:1 to 8:1). Typical average diameters of tabular silver halide grains range from about 0.3 to about 5 $\mu$m, although larger and smaller tabular grains are possible. Tabular silver halide grains preferably have a thickness of less than 0.4 $\mu$m, more preferably less than 0.3 $\mu$m, and in many instances less than 0.2 $\mu$m. The projected area of the tabular grain silver halide grains of a tabular grain emulsion preferably accounts for at least 50%, more preferably at least 80% and typically most preferably at least 90% of the projected area of all the silver halide grains of the emulsion. Silver bromide and silver bromoiodide are preferred silver halide compositions for tabular silver halide grains for use in many photographic elements, with silver bromoiodide compositions containing from 0 to 10 mol % silver iodide, preferably from 0.2 to 5 mol % silver iodide, and more preferably from 0.5 to 1.5% mol silver iodide. Such tabular grains may preferably have a higher surface iodide concentration relative to the average overall grain iodide concentration. The tabular grain silver halide grain dimensions and characteristics described above can be readily ascertained by procedures well known to those skilled in the art. The term "diameter" is defined as the diameter of a circle having an area equal to the projected area of the grain. The term "thickness" means the distance between two substantially parallel main planes constituting the tabular grain silver halide grains. Silver halide emulsions containing tabular silver halide grains can be prepared by various processes known for the preparation of photographic elements.

Silver halide emulsions are usually chemically sensitized, for example by sulfur sensitization using active gelatin or compounds such as thiosulfates, thioureas, mercapto compounds and rhodanines containing sulfur capable of reacting with silver; a reduction sensitization process using reducing substances such as stannous salts, amines, hydrazine derivatives, formamidinesulfinic acid, silane compounds and the like; a noble metal sensitization process using noble metal compounds such as complex salts of the Group VIII metals of the Periodic Table including platinum, iridium, palladium and the like as well as gold complex salts; alone or in combination with each other.

Spectral sensitization can be performed at any stage of silver halide preparation. It can be performed subsequent to the completion of chemical sensitization or concurrently with chemical sensitization, or can precede chemical sensitization, or even can commence prior to the completion of silver halide precipitation. The amount of sensitizing dye that is useful is typically in the range of from 0.001 to 10 millimoles per mole of silver halide, more typically from 0.1 to 4.0 millimoles per mole of silver halide. Optimum dye concentrations will depend upon the particular dye and silver halide grains employed, and can be determined by methods known in the art.

The photographic emulsion can include various compounds for preventing fog formation or stabilizing photographic characteristics during production, storage, or processing. For example, antifoggants or stabilizers include azoles such as benzothiazolium salts, nitroimidazoles, nitrobenzimidazoles, chlorobenzimid-azoles, bromobenzimidazoles, mercapto-thiazoles, mercaptobenzothiazoles, mercaptobenzimidazoles, mercaptothiadiazoles, aminotriazoles, benzotriazoles, nitrobenzotriazoles, mercaptotetrazoles particularly 1-phenyl-5-mercaptotetrazole; mercaptopyrimidines, mercapto-triazines, thioketo compounds such as oxazolinethione, azaindenes such as triazanidenes, tetraazaindenes particularly 4-hydroxy substituted 1,3,3a,7 tetraazaindenes, pentaazaindenes, benzenethiosulfonic acids, benzenesulfinic acids, benzenesulfonic amides and the like.

Various surface active agents can be incorporated into the photographic emulsion or other hydrophilic colloid layers of the photographic light-sensitive materials sensitized in accordance with the invention as coating aids, to prevent charging, improve slip properties, accelerate emulsification and dispersion, prevent adhesion, improve photographic characteristics such a accelerating development, high contrast, sensitization, and the like.

The photographic emulsion layer can also contain compounds such as polyalkylene oxide or its ether, ester, amine or the like derivatives, thioether compounds, thiomorpholines, quaternary ammonium salt compounds, urethane derivatives, urea derivatives, imidazole derivatives, and 3-pyrazolidones to increase sensitivity or contrast or accelerate development.

Water insoluble or only sparingly soluble synthetic polymer dispersions can be incorporated into the photographic emulsion layer or other hydrophilic colloid layer to improve dimensional stability and the like. Some synthetic polymers which can be used include homo or copolymers of alkyl acrylate or methacrylate, alkoxyalkyl acrylate or methacrylate, glycidyl acrylate or methacrylate, acrylamide or methacrylamide, vinyl esters such as vinyl acetate, acrylonitrile, olefins, styrene and the like and copolymers thereof with acrylic acid, methacrylic acid, alpha, beta-unsaturated dicarboxylic acid, hydroxyalkyl acrylate or methacrylate, sulfoalkyl acrylate or methacrylate, styrene-sulfonic acid and the like.

In addition to the concentrated dye-water composition of the invention for spectrally sensitizing photographic emulsions prior to coating on a support, other sensitizing dyes can be used which do not in themselves give rise to spectral sensitization but provide a supersensitizing effect such as, for example, aminostyryl compounds substituted with a nitrogen-containing heterocyclic group including those described in U.S. Pat. Nos. 2,933,390 and 3,635,721 which are hereby incorporated herein by reference, aromatic organic acid-formaldehyde condensates such as those described in U.S. Pat. No. 3,743,510 which is hereby incorporated herein by reference, cadmium salts, azaindene compounds and the like. It is also contemplated to use anionic dye dispersion compositions prepared in accordance with the invention in a layered sensitization dye combination, or a combination of two or more spectral sensitizing dyes wherein at least one of the dyes contains an anionic substituent and at least one of the dyes contains a cationic substituent, as described in U.S. Pat. Nos. 6,143,486, 6,165,703, 6,312,883 and 6,331,385, the disclosures of which are incorporated by reference herein. It is further contemplated that two or more anionic sensitizing dyes may be dispersed individually in accordance with the invention and added individually to a silver halide emulsion to be spectrally sensitized, or a combination of two or more such dyes may be co-dispersed prior to addition to a silver halide emulsion as taught in U.S. Pat. No. 5,965,345, the disclosure of which is incorporated by reference.

The photographic material can contain inorganic or organic hardeners in the emulsion layer or other hydrophilic colloid layer thereof. For example, chromium salts such as chromium alum, chromium acetate and the like; aldehydes such as formaldehyde, glyoxal, glutaraldehyde and the like; N-methylol compounds such as dimethylolurea, methyloldimethyl-hydantoin and the like; dioxane derivatives such as 2,3-dihydroxydioxane and the like; active vinyl compounds such as 1,3,5-triacryloylhexahydro-s-triazine and the like; mucohalogenic acids such as mucochloric acid, mucophenoxy-chloric acid and the like can be used, either alone or in combination.

When dyes, ultraviolet light absorbing agents, and the like are incorporated in the hydrophilic colloid layers of a photographic light-sensitive material, they may be mordanted with cationic polymers and the like. The photographic light-sensitive material can also contain hydroquinone derivatives, aminophenol derivatives, gallic acid derivatives, ascorbic acid derivatives and the like as color fog preventing agents.

Dyes which can be incorporated into the hydrophilic colloid layers of a photographic light sensitive material include benzotriazole compounds substituted with aryl groups, and 4-thiazolidone, benzophenone, cinnamic acid ester, butadiene, benzoxazole and the like compounds. Ultraviolet light absorbing couplers such as alpha naphthol type cyan dye forming couplers and ultraviolet light absorbing polymers can also be used. Such ultraviolet light absorbing agents can also be mordanted in a specific layer, if desired.

Photographic light sensitive elements prepared using silver halide emulsions spectrally sensitized in with a dye-water composition of the invention may contain water soluble dyes in the hydrophilic colloid layers as a filter dye or for other purposes such as irradiation prevention and the like. Some such suitable dyes include oxonol, hemioxonol, styryl, merocyanine, cyanine, azo and the like dyes. Oxonol, hemioxonal, and merocyanine dyes are particularly useful.

Any suitable color fading prevention agents can also be used as well as color image stabilizers, either alone or in combination with each other. Some suitable color fading prevention agents include hydroquinone derivatives, gallic acid derivatives, p-oxyphenol derivatives, bisphenols, and the like.

Silver halide photographic emulsions sensitized with dye water compositions in accordance with the invention can also contain various other additives used for photography including any suitable hardeners, surfactants, fluorescent whiteners, physical property modifiers such as humectants, water dispersants and the like; condensates of phenols and formalin and the like.

Silver halide emulsions sensitized in accordance with the invention can be coated on any suitable support and dried to prepare a light sensitive silver halide photographic element. Some suitable supports include paper, glass, cellulose acetate, cellulose nitrate, polyester such as polyethylene terephthalate, polyethylene, polypropylene and other well known supports, polyamide, polystyrene and the like or laminated products of two or more substrates such as laminated products of paper and a polyolefin such as polyethylene, polypropylene and the like. The support may be subjected to various surface modification treatments for improving adhesion to the silver halide emulsion such as subbing, electron impact treatment and the like.

Coating and drying of the silver halide photographic emulsion on the support may be carried out conventionally by dip coating, roller coating, multislide hopper coating, curtain flow coating and the like followed by drying. The invention is applicable to sensitization of emulsions for use in light-sensitive photographic color elements such as color negative films, color reversal films, color papers, etc., as well as black-and-white light-sensitive photographic elements such as X-ray light-sensitive elements, lithographic light-sensitive elements, black-and-white photographic printing papers, black-and-white negative films, etc.

Multilayer multicolor photographic materials typically contain layers sensitive to at least two different spectral wavelength ranges on a support. By combining various photographic silver halide emulsion layers sensitized to different wavelengths, intermediate layers, protective layers, filter layers, antihalation layers, backing layers and others, a light sensitive color photographic element can be formed. In such a case, each light sensitive emulsion layer can comprise two emulsion layers with different sensitivities. A multilayer natural color photographic material generally possesses at least one red-sensitive silver halide emulsion layer, at least one green-sensitive silver halide emulsion layer, and at least one blue-sensitive silver halide emulsion layer on a support. The order of the layers can be varied as desired. Ordinarily, a cyan forming coupler is present in the red-sensitive emulsion layer, a magenta forming coupler is present in the green-sensitive emulsion layer, and a yellow forming coupler is present in the blue-sensitive emulsion layer, respectively. Different combinations can be employed as desired.

Any suitable dye-forming couplers, that is, compounds capable of forming color upon oxidative coupling with aromatic primary amine developing agents such as phenylene-diamine derivatives, aminophenol derivatives and the like during color development processing, can be incorporated into the same or different photographic silver halide emulsion layer as desired. Examples of some such couplers include magenta couplers such as 5-pyrazolone coupler, cyanoacetylcoumarone couplers and open chain acylaceto-nitrile couplers, and the like; yellow couplers such as acylacetamide couplers including benzoylacetanilides, pivaloylacetanilides and the like; cyan couplers such as naphthol couplers and phenol couplers and the like. Preferably, nondiffusible couplers containing a hydrophobic group or ballast group within the molecule or polymeric coupler is used. They may be either 4-equivalent or 2-equivalent with respect to silver ions. Colored couplers capable of exerting color correction effects or couplers capable of releasing development inhibitors during the course of development or DIR couplers, can also be used. Two or more couplers can be employed.

The concentrated dye-water sensitizing compositions of the invention are particularly useful in sensitizing silver halide emulsions for use in radiographic films, particularly for tabular grain emulsions employed in such elements, coated on at least one surface, and more preferably on both surfaces of a polyethylene terephthalate support. Usually, radiographic film elements are associated with intensifying screens so as to be exposed to radiation emitted by the screens. The screens are made of relatively thick phosphor layers which transform X-rays into light radiation (e.g., visible light). The screens absorb a portion of X-rays much larger than the light-sensitive element and are used to reduce the X-ray dose necessary to obtain a useful image. According to their chemical composition, the phosphors can emit radiation in the blue, green or red region of the visible spectrum and the silver halide emulsions are sensitized to the wavelength region of the light emitted by the screens.

The exposed light-sensitive elements can be processed by any of the conventional processing techniques. The processing can be a black-and-white photographic processing for forming a silver image or a color photographic processing for forming a dye image depending upon the purpose, as is well known in the art.

EXAMPLES

Example 1

Several samples of a liquid crystal suspension of dye D-4 (Benzoxazolium, 5-chloro-2-(2-((5-chloro-3-(3-sulfopropyl)-2(3H)-benzoxazolylidene)methyl)-1-butenyl)-3-sulfopropyl)-, inner salt compound with N,N-diethylethanamine) were prepared as described below. Each sample was prepared at room temperature, approx. 20° C.

Sample 1.1: 60 g of the dry dye D-4 was added to a cylindrical vessel, of internal diameter 21 cm and height 25 cm, containing 120 g of Propanoic acid solution (Propanoic acid 71.93 g/kg, Sodium Hydroxide 39.1 g/kg) and 3820 g of water. After wetting of the dye, the solution was subjected to high shear mixing/agitation by mixing with a rotor at 1900 rpm for a total of 50 minutes, resulting in the full conversion of the solution into a liquid crystalline suspension, as determined by microscopic evaluation (particulate and agglomerate free). The dimensions of the tip of the rotor is a cylinder of 3 cm(diameter)×5 cm(height). The cylinder is designed to draw fluid from the top and bottom and expel it from slits at the side of the cylinder, when rotating.

Sample 1.2: 60 g of the dry dye D-4 was added to a cylindrical vessel, of internal diameter 21 cm and height 25 cm, containing 0.4 g of the surfactant BRIJ 93, 120 g of Propanoic acid solution (Propanoic acid 71.93 g/kg, Sodium Hydroxide 39.1 g/kg) and 3820 g of water. The solution was subjected to the same mixing profile as described in Sample 1.1. Microscopic evaluation revealed that full conversion to a liquid crystalline suspension was achieved after 15 minutes of agitation.

Sample 1.3: 60 g of the dry dye D-4 was added to a cylindrical vessel, of internal diameter 21 cm and height 25 cm, containing 0.4 g of the surfactant SILWET L-7602, 120 g of Propanoic acid solution (Propanoic acid 71.93 g/kg, Sodium Hydroxide 39.1 g/kg) and 3820 g of water. The solution was subjected to the same mixing profile as described in Sample 1.1. Microscopic evaluation revealed that full conversion to a liquid crystalline suspension was achieved after 15 minutes of agitation.

Sample 1.4: 60 g of the dry dye D-4 was added to a cylindrical vessel, of internal diameter 21 cm and height 25 cm, containing 4.0 g of an aqueous dispersion of the surfactant PLURONIC 31R1 (100 g/kg of PLURONIC 31R1 and 10 g/kg of ALKANOL-XC {2-Naphthalenesulfonic acid, tris(1-methylethyl)-, sodium salt}), 120 g of Propanoic acid solution (Propanoic acid 71.93 g/kg, Sodium Hydroxide 39.1 g/kg) and 3820 g of water. The solution was subjected to the same mixing profile as described in Sample 1.1. Microscopic evaluation revealed that full conversion to a liquid crystalline suspension was achieved after 25 minutes of agitation.

Sample 1.5: 120 g of the dry dye D-4 was added to a cylindrical vessel, of internal diameter 21 cm and height 25 cm, containing 120 g of Propanoic acid solution (Propanoic acid 71.93 g/kg, Sodium Hydroxide 39.1 g/kg) and 3760 g of water. The solution was subjected to the same mixing profile as described in Sample 1.1 except that agitation was discontinued after 30 minutes as the solution had reached the top of the vessel. Microscopic evaluation revealed that full conversion to a liquid crystalline suspension had not been achieved.

Sample 1.6: 120 g of the dry dye D-4 was added to a cylindrical vessel, of internal diameter 21 cm and height 25 cm, containing 0.4 g of the surfactant BRIJ 93, 120 g of Propanoic acid solution (Propanoic acid 71.93 g/kg, Sodium Hydroxide 39.1 g/kg) and 3760 g of water. The solution was subjected to the same mixing profile as described in Sample 1.1. Microscopic evaluation revealed that full conversion to a liquid crystalline suspension was achieved after 25 minutes of agitation.

The volumetric change in the various sample solutions, as a result of entrained air, was measured at the end of agitation as summarized in the following Table I.

TABLE I

| Sample | Wt % Dye | Nonionic Surfactant (HLB) | % increase in volume due to entrained air |
|---|---|---|---|
| 1.1 (Comparison) | 1.5 | None | 39.6 |
| 1.2 (Invention) | 1.5 | Brij 93 (5.1) | 2.8 |
| 1.3 (Invention) | 1.5 | Silwet L-7602 (5–8) | 3.5 |
| 1.4 (Invention) | 1.5 | Pluronic 31R1 (5–10) | 6.3 |
| 1.5 (Comparison) | 3.0 | None | >70 |
| 1.6 (Invention) | 3.0 | Brij 93 (5.1) | 6.6 |

The use of an anti-foaming nonionic surfactant in the preparation of this liquid crystal suspension resulted in a substantial decrease in entrained air, a shorter process time and the ability to increase dye concentration without excessive increase in air entrainment.

Example 2

The ability of surfactants having different HLB numbers to act as an antifoamant during the manufacture of an anionic sensitizing dye dispersion in accordance with the invention was tested by adding various surfactants to a liquid crystalline dispersion of dye D-4 prepared similarly as in Sample 1.1, and reagitating the dispersion and measuring foam formation as follows:

Agitation: 1 kg of the specified dye dispersion was weighed into a 1500 ml stainless steel container having the dimensions of 12 cm(diameter)×17 cm(height). The dispersion was then mixed with a rotor at 1900 rpm at room temperature. The dimensions of the tip of the rotor is a cylinder of 3 cm(diameter)×5 cm(height). The cylinder is designed to draw fluid from the top and bottom and expel it from slits at the side of the cylinder, when rotating. A diffuser stone connected to an air supply, via a rotometer, was dropped into the stirred dispersion. Air, at a flow rate of 800 ml/min was introduced via the diffuser stone.

Foam measurements: The 1 kg fluid in the container occupied a depth of 9 cm in the 17 cm high container. After the air flow was started, a stop watch measured the time for the foam to reach the top of the container. In the case where an antifoaming agent was added, the foam may have never reach the top of the container, in which case the height of the liquid plus foam was measured after 5 minutes, at which point a steady state had been reached.

The low shear viscosity (at $0.1\ s^{-1}$ shear rate) of the dye dispersion in the absence of antifoaming agent is close to 10,000 cp, whereas the high shear viscosity (at $1500\ s^{-1}$) is of the order of 10 cp. Table II shows the measurements of foaming (described above) obtained without any antifoaming agent (Sample 2.1) and with several antifoaming agentts having differing HLB values (Samples 2.2-2.11). All the antifoaming agents were tested at a level of 100 ppm, and Silwet L-7602 and Brij 93 were additionally tested at 25 ppm. HLB values are obtained from manufacturer specifications, unless noted.

TABLE II

| Sample | Nonionic Surfactant | Concen. (ppm) | HLB | Time to reach 17 cm (secs) | Fluid height after 300 sec of air entrainment (cm) |
|---|---|---|---|---|---|
| 2.1 (Comparison) | None | — | — | 62 | — |
| 2.2 (Invention) | Silwet L-7602 | 100 | 5–8 | Did not reach | 12.5 |
| 2.3 (Invention) | Silwet L-7602 | 25 | 5–8 | Did not reach | 13.6 |
| 2.4 (Invention) | Brij 93 | 100 | 5.1* | Did not reach | 11.7 |
| 2.5 (Invention) | Brij 93 | 25 | 5.1* | Didnot reach | 11.2 |
| 2.6 (Invention) | Tetronic 150R1 | 100 | 1 | 230 | — |
| 2.7 (Invention) | FC-171 | 100 | 2.8* | Did not reach | 9.7 |
| 2.8 (Invention) | Glucate DO | 100 | 5.0 | Did not reach | 11.2 |
| 2.9 (Comparison) | Tetronic 908 | 100 | 31 | 111 | — |
| 2.10 (Comparison) | Pluronic L44 | 100 | 16 | 75 | — |
| 2.11 (Invention) | Silwet L-7210 | 100 | 5–8 | Did not reach | 12.1 |

*Calculated value

As seen from the data in Table II, most of the surfactants having HLB values below 12 did not allow the foam to reach the top of the can. Use of Tetronic 150R1, having an HLB value of 1, did result in foam reaching the top, but took a significantly longer time. The two comparison surfactants with HLB values higher than 12 performed comparatively poorly, with almost no benefit compared to having no antifoaming agent.

Example 3

A liquid crystalline dispersion of dye D-35 was prepared and tested similarly as for dye D-4 in Example 2. This dye dispersion is not as viscous and shear thinning as the dispersions of dye D-4 used in Examples 1 and 2, with the low shear viscosity (at $0.1\ s^{-1}$ shear rate) of the dye dispersion in the absence of antifoaming agent being about 20 cp, whereas the high shear viscosity (at $1500\ s^{-1}$) is about 4 cp. The dye was less adept at stabilizing a foam. Consequently, in the absence of an antifoaming agent surfactant, the introduction of air did not result in the foam reaching the top of the container. Thus, the only response recorded is the height of liquid and foam reached after 300 seconds of introduction of air. Table III shows the results.

TABLE III

| Sample | Nonionic Surfactant | Concentration (ppm) | HLB | Fluid height after 300 sec of air entrainment (cm) |
|---|---|---|---|---|
| 3.1 (Comparison) | None | — | — | 10.5 |
| 3.2 (Invention) | Silwet L-7602 | 100 | 5–8 | 9.2 |
| 3.3 (Invention) | Silwet L-7602 | 25 | 5–8 | 9.5 |
| 3.4 (Invention) | Brij 93 | 100 | 5.1* | 13.1 |
| 3.5 (Invention) | Brij 93 | 25 | 5.1* | 11.2 |
| 3.6 (Invention) | Glucate DO | 100 | 5.0 | 10.8 |

*Calculated value

Since the foaming property is low, the antifoamant surfactants are in this example not necessarily required to perform a defoaming function. It is noted that the presence of the surfactants in any event do not significantly detrimentally effect the level of air entrainment. Further, the presence of surfactant advantageously enables more complete delivery of the sensitizing dye composition from the equipment used to prepare the dye composition.

Example 4

A liquid crystalline dispersion of dye D-10 was prepared and tested similarly as for dye D-4 in Example 2. This dye dispersion is not as viscous and shear thinning as the dispersions of dye D-4 used in Examples 1 and 2, but did show foaming propensity. The low shear viscosity (at $0.1 \text{ s}^{-1}$ shear rate) of the dye dispersion in the absence of antifoaming agent is about 200 cp, whereas the high shear viscosity (at $1500 \text{ s}^{-1}$) is about 10 cp. Both measure of foam formation were recorded as in Example 2, and are reported in Table IV.

TABLE IV

| Sample | Nonionic Surfactant | Concen. (ppm) | HLB | Time to reach 17 cm (secs) | Fluid height after 300 sec of air entrainment (cm) |
|---|---|---|---|---|---|
| 4.1 (Comparison) | None | — | — | 120 | — |
| 4.2 (Invention) | Silwet L-7602 | 100 | 5–8 | Did not reach | 15.2 |
| 4.3 (Invention) | Silwet L-7602 | 25 | 5–8 | Did not reach | 12.8 |
| 4.4 (Invention) | Brij 93 | 100 | 5.1* | Did not reach | 10.7 |
| 4.5 (Invention) | Brij 93 | 25 | 5.1* | Did not reach | 9.8 |

*Calculated value

The above results demonstrate again that both nonionic surfactants are effective antifoamants, even at levels as low as 25 ppm.

Although the invention has been described in considerable detail in the foregoing it is to be understood that such detail is solely for the purpose of illustration and that variations can be made by those skilled in the art without departing from the spirit and scope of the invention except as set forth in the claims.

What is claimed is:

1. A process for preparing a concentrated photographic spectral sensitizing dye-water composition which comprises adding an anionic sensitizing dye to an aqueous medium in the substantial absence of organic solvent, and agitating the combined dye and aqueous medium, wherein the anionic dye forms a liquid-crystalline dye phase in the aqueous medium and the agitation is performed in the presence of a nonionic surfactant having an HLB of less than 12 and an aqueous solubility at 25° C. of greater than 10 ppm, which nonionic surfactant is in the aqueous medium at a level of from 10 to 1000 ppm.

2. A process according to claim 1, wherein the viscosity at $0.1 \text{ s}^{-1}$ shear rate of the dye-water composition in the absence of the nonionic surfactant would be greater than 100 cp, and the surfactant is present at a level sufficient to substantially reduce air entrainment during agitation of the dye-water composition.

3. A process according to claim 2, wherein the viscosity at $0.1 \text{ s}^{-1}$ shear rate of the dye-water composition in the absence of the nonionic surfactant would be greater than 500 cp.

4. A process according to claim 1, wherein nonionic surfactant is selected to have an HLB number of at least 2.

5. A process according to claim 1, wherein the anionic dye is present in the dye-water composition at a concentration of at least 0.4 wt %.

6. A process according to claim 1, wherein the anionic dye is present in the dye-water composition at a concentration of from 0.4 to 5 wt %.

7. A process according to claim 1, wherein the anionic dye is present in the dye-water composition at a concentration of from 1.0 to 5 wt %.

8. A process according to claim 1, wherein the anionic dye is present in the dye-water composition at a concentration of from 2.0 to 5 wt %.

9. A process according to claim 1, wherein the agitation is performed at a temperature of from 20 to 50° C.

10. A process according to claim 1, wherein agitation of the dye-water composition is performed for less than 30 minutes to form the liquid-crystalline dye phase in the aqueous medium.

11. A process according to claim 1, wherein the nonionic surfactant is present in the dye-water composition at a level that is less than 500 ppm.

12. A process according to claim 1, wherein the nonionic surfactant is present in the dye-water composition at a level of from 10 to 200 ppm.

13. A process according to claim 1, wherein the nonionic surfactant is an alkoxylated poly(dimethyl siloxane).

14. A process according to claim 1, wherein the nonionic surfactant is an ethoxylated alcohol.

15. A process according to claim 1, wherein the nonionic surfactant is a polypropylene oxide-polyethylene oxide block copolymer.

16. A process according to claim 1, wherein the nonionic surfactant is a hydrophobically modified derivative of a mono or disaccharide compound.

17. A process according to claim 1, wherein the dye is an anionic cyanine spectrally sensitizing dye.

18. A process according to claim 17 wherein the dye is of the formula $$\overset{\overset{Z_1}{\frown}}{\underset{\underset{(L=L)_{n-1}-L=C-(CH=CH)_q=N-A'}{|}}{C=(CH-CH)_p=N-A}} \overset{Z_2}{\frown}$$

wherein $Z_1$ and $Z_2$ each independently represents the atoms necessary to complete a substituted or unsubstituted heterocyclic nucleus, each L independently represents a substituted or unsubstituted methine group, n is a positive integer of from 1 to 4, p and q each independently represents 0 or 1, A and A' each independently represents an alkyl group substituted with an anionic acid solubilizing group, and X represents hydrogen or a cationic counterion to balance the charge of the molecule.

19. A process according to claim 18, wherein A and A' each independently represents a sulfoalkyl group.

20. A process according to claim 17, wherein the dye has the formula

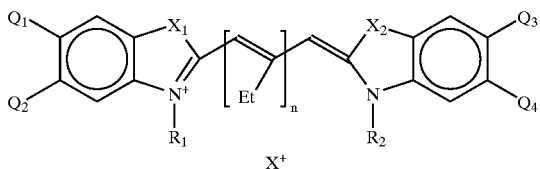

wherein n is 0 or 1; $X_1$ and $X_2$ each independently represents oxygen or sulfur; $Q_1$, $Q_2$, $Q_3$ and $Q_4$ each independently represents hydrogen, halogen, alkyl, aryl, alkoxy, aryloxy or may contain the atoms necessary to form a beta or linear naphtho-fused ring; $R_1$ and $R_2$ each independently represents an alkyl group substituted with an anionic acid solubilizing group; and $X^+$ represents hydrogen or a cationic counterion to balance the charge of the molecule.

21. A process according to claim 20 wherein $R_1$ and $R_2$ each independently represents a sulfoalkyl group.

22. A process according to claim 1 wherein the dye is of the formula

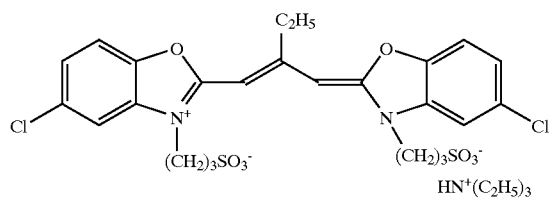

23. A process according to claim 1 wherein the dye is of the formula

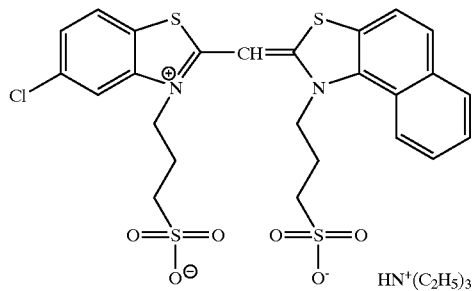

24. A process according to claim 1 wherein the dye is of the formula

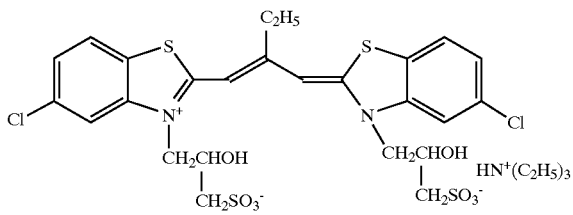

25. A stable, concentrated dye-water composition substantially free of organic solvent for use in spectrally sensitizing photographic emulsions comprising: an aqueous medium, an anionic sensitizing dye dispersed in the aqueous medium in the form of a liquid-crystalline dye phase, and from 10 to 1000 ppm of a nonionic surfactant having an HLB of less than 12 and an aqueous solubility at 25° C. of greater than 10 ppm.

26. A composition according to claim 25, wherein the anionic dye is dispersed in the aqueous medium at a concentration of at least 0.4 wt %.

27. A composition according to claim 25, wherein the anionic dye is dispersed in the aqueous medium at a concentration of from 0.4 to 5 wt %.

28. A composition according to claim 25, wherein the anionic dye is dispersed in the aqueous medium at a concentration of from 1.0 to 5 wt %.

29. A composition according to claim 25, wherein the anionic dye is dispersed in the aqueous medium at a concentration of from 2.0 to 5 wt %.

30. A composition according to claim 25, wherein the nonionic surfactant is present at a level that is less than 500 ppm.

31. A composition according to claim 25, wherein the nonionic surfactant is present at a level of from 10 to 200 ppm.

* * * * *